Patented Nov. 28, 1944

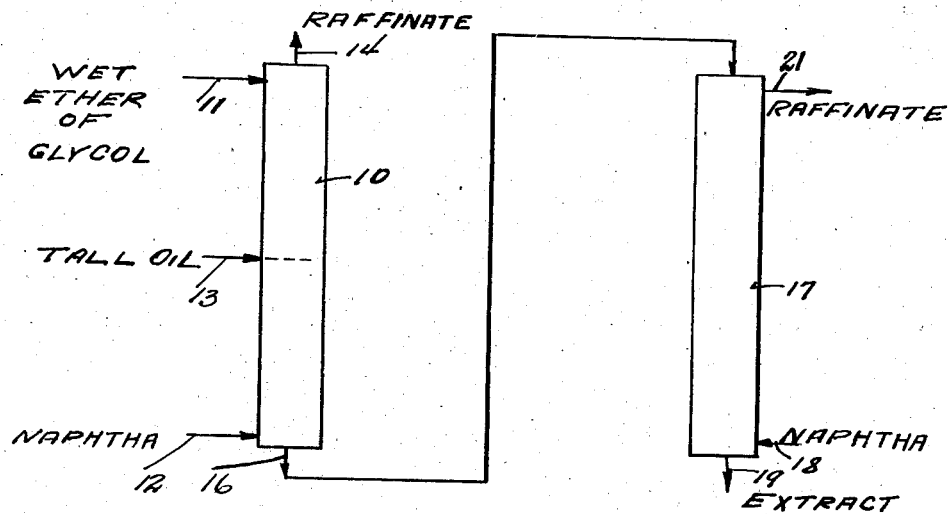
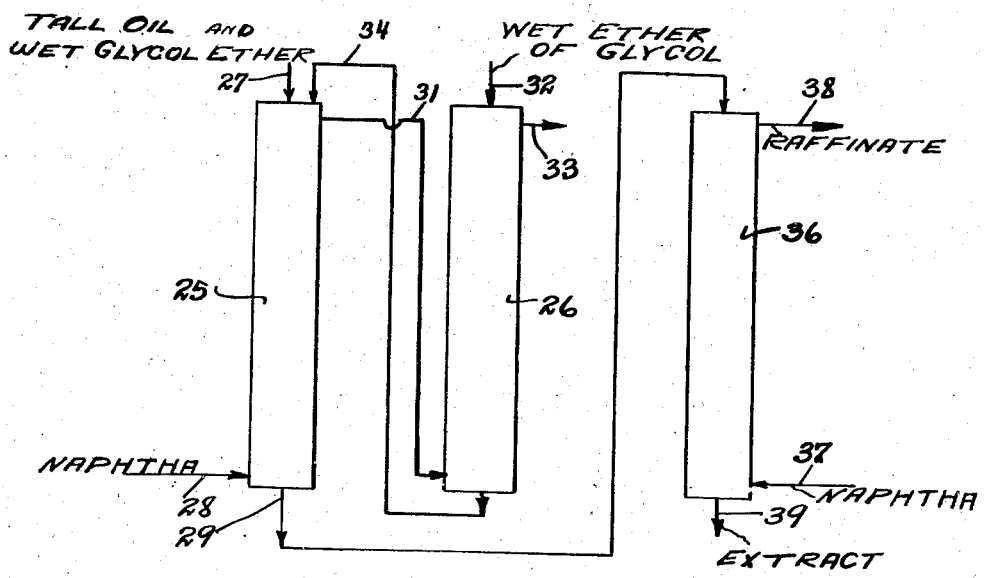

2,363,925

UNITED STATES PATENT OFFICE 2,363,925

SEPARATION OF TALL OIL INTO COMPONENTS

Frederick W. Adams, Pittsburgh, Pa., assignor to Pittsburgh Plate Glass Company, Allegheny County, Pa., a corporation of Pennsylvania Application December 19, 1941, Serial No. 423,597

4 Claims. (Cl. 260—97.5)

The present invention relates to the treatment of tall oil and it has particular relation to treatment of tall oil for purposes of separating it into fractions containing certain components of the oil in higher concentrations than occur in the original oil.

One object of the invention is to separate tall oil into fractions comprising certain components of the oil in such proportions as to be substantially more valuable for certain commercial uses than the original oil.

A second object of the invention is to provide a process of the foregoing type which is simple and economical to operate.

These and other objects of the invention will be apparent from consideration of the following specification and the appended claims.

In the manufacture of paper pulp by the sulfate process an oily material termed "tall oil" is liberated and collected. The amount obtained constitutes many thousands of tons each year. In composition the oil consists primarily of:

| | Per cent |
|---|---|
| Fatty acids | 50 to 60 |
| Resin acids | 34 to 48 |
| Non-acids | 6 to 10 |

Heretofore, the tall oil has had but little commercial application and its value has been very slight. However, it is recognized that at least a portion of the components, if they could be obtained in sufficiently pure form, would be highly valuable for many industrial applications. For example, the free fatty acids would be excellent for use as modifiers in alkyd resins and other resinous products. The resin acids at present perhaps are of less commercial value than the fatty acids, but they are suitable for use in the production of soaps and perhaps as modifiers in certain types of alkyd resins. Of course other applications are possible. The non-acids in the tall oil apparently include sterols, many of which, when in sufficiently pure form, are highly valuable.

The present invention contemplates the simultaneous extraction of the oil with an active polar solvent having an affinity for the resin components and a hydrocarbon solvent which has a preference for the free fatty acids and the non-acid components and is relatively immiscible with the polar solvent and of a different specific gravity. As one feature, the extract phase comprising the polar solvent is further extracted countercurrently with additional hydrocarbon in order to obtain a raffinite rich in free fatty acids.

For a better understanding of the invention reference may be had to the accompanying drawing in which Figures 1 and 2 diagrammatically illustrate preferred systems applicable to the practice of the invention.

In the drawing like numerals refer to like parts throughout. As shown in Figure 1, a column 10 suitable for countercurrent extraction operations and which may be filled with a suitable packing, such as Raschig rings designed to promote thorough intermingling and contact of the liquids, is provided at its upper extremity with an inlet indicated by arrow 11. Through this inlet, a polar solvent or polar solvent mixture, such as the monoethyl ether of ethylene glycol or a mixture of water and methyl or ethyl alcohol or water and acetone or furfural saturated with water may be introduced. A hydrocarbon solvent such as solvent naphtha is introduced at the bottom of the column through an inlet indicated by the arrow 12. The tall oil to be extracted is introduced, as indicated at 13, at an intermediate zone in the system preferably about midway between the inlets for the solvents. It may be admixed with several times its own volume of the polar solvent before it is so introduced.

The raffinate fraction comprising primarily the hydrocarbon and such components of the tall oil as are soluble therein, e. g., fatty acids, sterols and other unsaponifiable matter, is drawn off at the top of the column to the line indicated by the arrow 14. At the bottom of the column the extract, including polar solvent and a fraction rich in resin acids, passes out through a conduit indicated by the arrow 16.

The extract phase is carried by the line 16 to a second column 17 and introduced into the top of the latter. Hydrocarbon, such as solvent naphtha, is introduced at the bottom of this column by a feed line 18. The extract phase containing a fraction of the tall oil rich in resin acids and low in fatty acids and sterols passes out at the bottom through the conduit 19. The raffinate from the second column consisting primarily of naphtha containing a fraction of the tall oil very rich in fatty acids along with some resin acids and sterols passes out through the line indicated by the arrow 21.

In the operation of the foregoing apparatus it is preferred that the ratio of polar solvent, such as the wet ether of ethylene glycol, be relatively high as compared to the tall oil and the naphtha. The naphtha ratio may be substantially less in quantity than the tall oil and may be as low as 30 or 40 per cent of the tall oil content. The tall oil introduced into the intermediate portion of the column 10 may be dissolved in a large amount of solvent. The ratio of the ingredients, for example, may comprise 1297 parts of tall oil dissolved in about 14,443 parts of the methyl ether of ethylene glycol containing about 8 to 12 percent of water. A further feed of the methyl ether of ethylene glycol containing about 8 to 12 percent of water and in the ratio of about 4,675 parts may be introduced into the top of the column 10. About 847 parts of naphtha is introduced at the bottom of the column 10. When the system is so operated a small raffinate fraction containing most of the non-acid constituents along with a high proportion of fatty acids and a small amount of resin acid dissolved in naphtha is obtained at the top of the column. The extract phase includes most of the resin acid constituents dissolved in the polar solvent. This extract phase is passed into the column 17 where it may be extracted with a high ratio of naphtha. The system is preferably operated at a temperature of about 24° C., but temperatures 20° C. or more higher or lower are, also, contemplated.

In Figure 2 is disclosed a three column system which in principle of operation is similar to that disclosed in Figure 1. It includes two columns 25 and 26 that function similarly to column 10. The tall oil, preferably in admixture with a polar solvent, is fed, as indicated at 27, into the top of column 25. Naphtha or its equivalent is fed in near the bottom of the column, as indicated at 28.

The extract of the polar solvent containing much of the free resin acids in solution passes out as indicated at 29 from the lower portion of the column. Its further treatment will be later described.

The raffinate phase comprising naphtha and a fraction rich in sterols and fatty acids is taken from the upper portion of the column as indicated at 31. It is fed to the lower portion of the column 26 and flows upwardly in the latter countercurrently to a flow of polar solvent, e. g., wet ether of ethylene glycol introduced into the upper part of the column at 32. The raffinate from the upper part of this second column and consisting mainly of fatty acids and non-saponifiables in the naphtha is drawn off as indicated at 33. The extract rich in resin acids and containing some fatty acids is recycled through line 34 to the top of column 25 for further extraction with naphtha.

The extract phase passing from column 25 through line 29 is reextracted in column 36 with additional naphtha introduced at the bottom of the column through line 37. The second raffinate, consisting mainly of naphtha in which is dissolved a fraction rich in free fatty acids, is drawn off from near the top of the column as indicated at 38, while the extract of polar solvent, in which is dissolved a fraction rich in resin acids, is drawn off at the bottom of the column as indicated at 39. The solvents may be recovered from all of the fractions by evaporation or by crystallization methods.

It is to be noted that according to the present method a raffinate fraction, dissolved in a small amount of naphtha or other appropriate non-polar solvent, is extracted with a very large ratio of polar solvent. This fraction is very rich in sterols and also includes a high percentage of free fatty acids. It is drawn off through lines 14 or 33.

What I claim is:

1. A method of treating tall oil, which comprises flowing naphtha having a preferential solvent action for fatty acids into one end of a solvent system and a mixture of water and the methyl ether of ethylene glycol having a preferential solvent action for resin acids into the other end of said system and flowing the two solvents mutually countercurrently through the system, introducing tall oil at approximately mid portion of the system, removing the naphtha saturated with a fraction of tall oil which is enriched in fatty acids and impoverished in resin acids at the end of the system contiguous to the inlet for methyl ether of ethylene glycol and withdrawing the methyl ether of ethylene glycol saturated with the fraction of tall oil enriched in resin acids and impoverished in fatty acids at the other end of the system, then countercurrently extracting the methyl ether of ethylene glycol and the dissolved tall oil fraction with separate portions of naphtha to form a new fraction of tall oil, the one dissolved in the naphtha being further enriched in fatty acids and impoverished in resin acids.

2. A method of treating tall oil, which comprises flowing naphtha having a preferential solvent action for fatty acids of tall oil into one end of a solvent system and flowing a solvent which is immiscible with and of a different density from the naphtha and having a preferential solvent action for the resin acids of tall oil into the other end of said system and flowing the two solvents mutually countercurrently through the system, introducing tall oil at approximately the mid portion of the system, removing the naphtha saturated with a fraction of tall oil which is enriched in fatty acids and impoverished in resin acids at the end of the system contiguous to the inlet for the solvent for resin acids, withdrawing the solvent having preferential solvent action for resin acids saturated with a fraction of tall oil enriched in said resin acids and impoverished in fatty acids at the end of the system contiguous to the inlet for solvent for fatty acids, then countercurrently extracting the solvent for resin acids and the dissolved tall oil fraction therein with a separate portion of the solvent for fatty acids, to form two new fractions of tall oil in mutually immiscible solvents, the one dissolved in the naphtha being further enriched in fatty acids and impoverished in resin acids.

3. A method of treating tall oil, which comprises flowing naphtha having a preferential solvent action for fatty acids of tall oil into one end of a solvent system and flowing a solvent which is immiscible with and of a different density from the naphtha and having a preferential solvent action for the resin acids of tall oil into the other end of said system and flowing the two solvents mutually countercurrently through the system, introducing tall oil at approximately the mid portion of the system, removing the naphtha saturated with a fraction of tall oil which is enriched in fatty acids and impoverished in resin acids at the end of the system contiguous to the inlet for the solvent for resin acids, withdrawing the solvent having preferential solvent action for resin acids saturated with a fraction of tall oil enriched in said resin acids and impoverished in fatty acids at the end of the system contiguous to the inlet for solvent for fatty acids, then countercurrently extracting the solvent for resin acids and the dissolved tall oil fraction therein with a separate portion of the solvent for fatty acids, to form two new fractions of tall oil in mutually immiscible solvents, the one dissolved in the naphtha being further enriched in fatty acids and impoverished in resin acids, the ratio of solvent for resin acids to naphtha being so great that most of the tall oil passes out in the extract and a raffinate greatly enriched in non-acid constituents of the tall oil is obtained.

4. A method of treating tall oil, which comprises flowing naphtha having a preferential solvent action for fatty acids of tall oil into one end of a solvent system and flowing a solvent which is immiscible with and of a different density from the naphtha and having a preferential solvent action for the resin acids of tall oil into the other end of said system and flowing the two solvents mutually countercurrently through the system, introducing tall oil at approximately the mid portion of the system, removing the naphtha saturated with a fraction of tall oil which is enriched in fatty acids and impoverished in resin acids at the end of the system contiguous to the inlet for the solvent for resin acids, withdrawing the solvent having preferential solvent action for resin acids saturated with a fraction of tall oil enriched in said resin acids and impoverished in fatty acids at the end of the system contiguous to the inlet for solvent for fatty acids, then countercurrently extracting the solvent for resin acids and the dissolved tall oil fraction therein with a separate portion of the solvent for fatty acids, to form two new fractions of tall oil in mutually immiscible solvents, the one dissolved in the naphtha being further enriched in fatty acids and impoverished in resin acids, the tall oil being admixed with solvent for resin acids before it is introduced into the system.

FREDERICK W. ADAMS.